(12) United States Patent
Sakigawara et al.

(10) Patent No.: US 7,549,808 B2
(45) Date of Patent: Jun. 23, 2009

(54) MONITOR CAMERA

(75) Inventors: Masayuki Sakigawara, Kanagawa (JP);
Masami Takahashi, Kanagawa (JP);
Toshikazu Tatewaki, Kanagawa (JP);
Jyouji Wada, Kanagawa (JP); Izumi Satou, Tokyo (JP)

(73) Assignee: Panasonic Corporation, Osaka (JP)

( * ) Notice: Subject to any disclaimer, the term of this patent is extended or adjusted under 35 U.S.C. 154(b) by 336 days.

(21) Appl. No.: 10/597,213

(22) PCT Filed: Feb. 7, 2005

(86) PCT No.: PCT/JP2005/001767

§ 371 (c)(1),
(2), (4) Date: Jul. 17, 2006

(87) PCT Pub. No.: WO2005/076596

PCT Pub. Date: Aug. 18, 2005

(65) Prior Publication Data

US 2008/0253760 A1    Oct. 16, 2008

(30) Foreign Application Priority Data

Feb. 10, 2004 (JP) .............................. 2004-033631
Feb. 2, 2005 (JP) .............................. 2005-026493

(51) Int. Cl.
*G03B 17/00* (2006.01)
*H04N 9/47* (2006.01)
*B01D 47/00* (2006.01)
*F02M 37/00* (2006.01)
*F02M 69/02* (2006.01)

(52) U.S. Cl. ..................... 396/427; 348/151; 348/373; 261/26

(58) Field of Classification Search ................. 396/248, 396/427, 463, 465, 466, 484, 489; 261/26; 348/151, 373
See application file for complete search history.

(56) References Cited

U.S. PATENT DOCUMENTS 4,414,576 A * 11/1983 Randmae ..................... 348/373

(Continued)

FOREIGN PATENT DOCUMENTS

EP    0 295 054 A2    12/1988

(Continued)

OTHER PUBLICATIONS

JP 2002-218440, machine translation in English, 13 pages, Aug. 2, 2002.*

(Continued)

*Primary Examiner*—Melissa J Koval
(74) *Attorney, Agent, or Firm*—Pearne & Gordon LLP

(57) ABSTRACT

A monitor camera device (10) has a camera housing (12) and a dehumidification regulation body (14). The dehumidification regulation body (14) has a dehumidification element (42), an electrode, and an engaging portion engaging with an engaged portion of the camera housing (12). One end side of the electrode is constructed so as to supply a power source to the dehumidification element (42), and the other end side penetrates through the engaging portion of the dehumidification regulation body (14). The dehumidification regulation body (14) is detachably attached to the camera housing (12) by the engaging portion of the dehumidification regulation body (14) and the engaged portion of the camera housing (12). The monitor camera device can be downsized while providing a dehumidification regulating function.

9 Claims, 11 Drawing Sheets

U.S. PATENT DOCUMENTS

| | | | |
|---|---|---|---|
| 5,003,041 A * | 3/1991 | Morris et al. | 525/444 |
| 5,678,106 A * | 10/1997 | Goto et al. | 396/489 |
| 5,946,404 A * | 8/1999 | Bakshi et al. | 382/103 |
| 6,268,882 B1 * | 7/2001 | Elberbaum | 348/151 |
| 2002/0140848 A1 | 10/2002 | Cooper et al. | |
| 2006/0186561 A1 * | 8/2006 | Song et al. | 261/26 |

FOREIGN PATENT DOCUMENTS

| EP | 0 428 414 A1 | 5/1991 |
|---|---|---|
| EP | 1 202 616 A1 | 5/2002 |
| JP | 60-181846 | 9/1985 |
| JP | 61-047037 | 3/1986 |
| JP | 6-63343 | 3/1994 |
| JP | 7-46559 | 5/1995 |
| JP | 2673477 B1 | 7/1997 |
| JP | 2000-202231 | 7/2000 |
| JP | 3075351 | 11/2000 |
| JP | 2002-218440 * | 8/2002 |
| JP | 2003-143449 | 5/2003 |

OTHER PUBLICATIONS

JP 3075351, machine translation in English, 6 pages, Nov. 22, 2000.*
Machine Translation in English of JP2003-143449, 24 pages, listed as Hamamatsu Photonics KK, published May 6, 2003 on applicant's IDS filed Jan. 26, 2009.*
Machine English translation of JP 05-322060, published 1993, 11 pages.*
European Search Report for EP 05 70 9819.6.

* cited by examiner

CROSS-SECTION AA

OUTSIDE OF THE HOUSING

INSIDE OF THE HOUSING

CROSS-SECTIONAL SHAPE OF O-RING 59

MOUNTED STATE

MONITOR CAMERA

TECHNICAL FIELD

The present invention relates to a monitor camera provided with a dehumidifying function.

BACKGROUND ART

In the related art, a dehumidification regulation device having a dehumidification regulation body with dehumidification element to be mounted to a storage of various articles for dehumidifying the internal space is known. Such a dehumidification regulation device is disclosed in JP-A-2000-202231 (pp. 2, FIG. 6). Such a dehumidification regulation device has a structure in such a manner that a dehumidification regulation body is mounted to an inside of the storage for supplying power to the dehumidification regulation body from the inner side of the storage.

As a monitor camera device in the related art, a camera having a dehumidifying function using a heater or a fan is generally known. Such a camera is disclosed in Japanese Utility Model No. 3075351 (pp. 2, FIG. 2).

However, in the monitor camera device in the related art, the heater or the fan occupy a space. Therefore, the monitor camera device itself is upsized.

Being different from a large sized housing such as the storage in which the dehumidification regulation body is used in the related art, a housing of the monitor camera device is small. Therefore, even when an attempt is made to mount the dehumidification regulation body to the monitor camera device, the camera housing is not suitable for the dehumidification regulation body having a mounting structure to be mounted from the inside as the one in the related art.

DISCLOSURE OF INVENTION

Problem to be Solved by the Invention

In view of such a background as described above, it is an object of the present invention to provide a monitor camera device which can be downsized while having a dehumidification regulating function.

Means for Solving the Problem

A monitor camera device according to an aspect of the present invention includes: a camera housing having an engaged portion, and a dehumidification regulation body having a dehumidification element, an electrode, and an engaging portion that engages the engaged portion of the camera housing, the dehumidification regulation body being configured so that one end of the electrode supplies a power source to the dehumidification element and the other end of the electrode penetrates through the engaging portion of the dehumidification regulation body, the dehumidification regulation body being detachably attached to the camera housing by the engaging portion of the dehumidification regulation body and the engaged portion of the camera housing.

The monitor camera device according to another aspect of the present invention includes a camera housing provided with a screw hole and a dehumidification regulation body having a dehumidification element, an electrode, and a regulation body member having a screw shape and integrating the dehumidification element and the electrode therein, and the regulation body member is mounted to the screw hole of the camera housing.

Another aspect of the present invention is a dehumidification regulation body, and the dehumidification regulation body includes a dehumidification element, an engaging portion that engages an engaged portion of a camera housing, and an electrode whose one end supplies a power source to the dehumidification element and the other end penetrates through the engaging portion, and the dehumidification regulation body can be detachably attached to the camera housing by the engaging portion of the dehumidification regulation body and the engaged portion of the camera housing.

As described below, the present invention includes other aspects. Therefore, disclosure of the present invention is intended to provide a part of the aspects, and not intended to limit the scope of the invention which is described and claimed here.

REFERENCE NUMERALS

Figure 1:
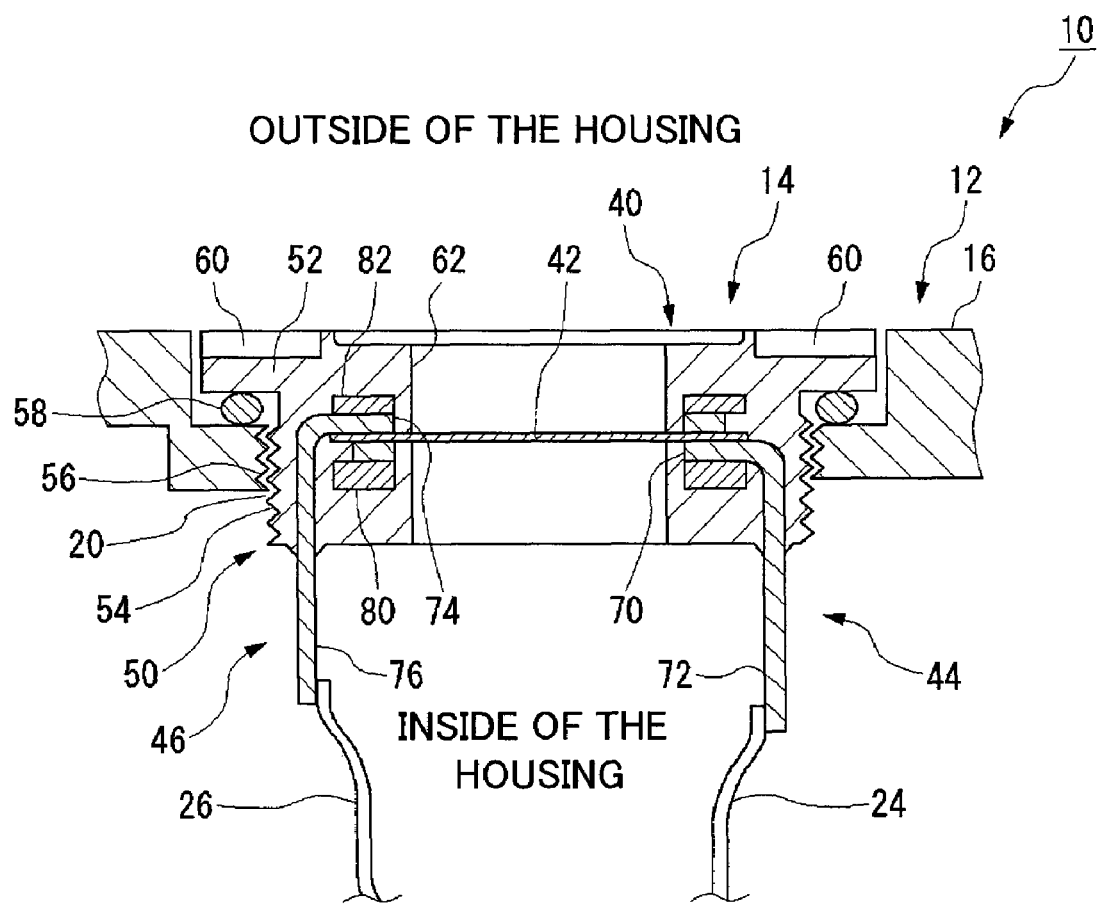
FIG. 1 is a cross-sectional view of a dehumidification regulation body portion of a monitor camera device according to an embodiment of the present invention.

10 monitor camera device
12 camera housing
14 dehumidification regulation body
16 housing body
18 lens portion housing
20 mounting hole
22 cover
24, 26 lead wire
28 connector
30 substrate 40 regulation body member
42 dehumidification element
44, 46 electrode terminal piece
50 screw member
52 screw head portion
54 male thread
56 female thread
58 O-ring
60 tool groove
62 opening
70, 74 contact portion
72, 76 terminal portion

BEST MODE FOR CARRYING OUT THE INVENTION

Detailed Description of the present invention will be given below. However, the detailed description and the attached drawings are not intended to limit the invention. Instead, the scope of the invention is defined by attached claims.

A monitor camera device according to an embodiment includes a camera housing having an engaged portion, and a dehumidification regulation body having a dehumidification element, an electrode, and an engaging portion that engages the engaged portion of the camera housing, the dehumidification regulation body being configured so that one end of the electrode supplies a power source to the dehumidification element and the other end of the electrode penetrates through the engaging portion of the dehumidification regulation body, the dehumidification regulation body being detachably attached to the camera housing by the engaging portion of the dehumidification regulation body and the engaged portion of the camera housing.

In this arrangement, since the one end of the electrode supplies the power source to the dehumidification element and the other end penetrates through the engaging portion of the dehumidification regulation body, the power source can be supplied to the dehumidification regulation body engaged with the camera housing through the engaging portion from an inside of the housing. In this manner, since the dehumidification regulation body can be mounted while occupying only a small space in the camera housing, downsizing of the monitor camera device is achieved while providing a dehumidification regulating function.

In this monitor camera device, the engaging portion is a screw member provided with a male thread on an outer periphery thereof. In this arrangement, the structure of the engaging portion can be downsized, and hence further downsizing is achieved.

The dehumidification element and the electrode are integrated in the screw member. In this arrangement, the dehumidification regulation body can be downsized, and hence further downsizing of the monitor camera device is achieved.

The dehumidification element is provided with a solid high-polymer electrolyte film interposed on both surfaces thereof between electrode films, and the dehumidification element is arranged with one surface faced an outside of the camera housing and with the other surface faced an inside of the camera housing. In this arrangement, the dehumidification regulation body can be downsized, and hence further downsizing of the monitor camera device is achieved.

The electrode includes an electrode terminal piece, and the electrode terminal piece includes a contact portion that comes into contact with the electrode film and a terminal portion that extends from the contact portion toward the inside of the camera housing through the engaging portion. In this arrangement, by mounting the dehumidification regulation body to the camera housing and connecting the power source to the electrode terminal piece, the dehumidifying function is obtained. The dehumidification regulation body can be provided in a small space, and hence further downsizing of the monitor camera device is achieved.

The contact portion of the electrode terminal piece is provided along an edge of the dehumidification element, the terminal portion is projected from a predetermined portion of the contact portion, and a pair of electrode terminal pieces are provided on one surface and the other surface of the dehumidification element so as to face the opposite directions from each other. In this arrangement, since the pair of electrode terminal pieces are provided in the opposite directions from each other, the terminal portions of both polarities are positioned on the opposite sides with the intermediary of the dehumidification element. Therefore, insulation of the electrodes can be ensured easily. Accordingly, downsizing of the dehumidification regulation body and further downsizing of the monitor camera device in association thereto are achieved.

According to another aspect of the invention, a monitor camera device in this embodiment includes a camera housing provided with a screw hole and a dehumidification regulation body having a dehumidification element, an electrode, and the regulation body member having a screw shape and including the dehumidification element and the electrode integrated therein, and the regulation body member is mounted to the screw hole of the camera housing.

In this arrangement, the dehumidification regulation body is configured by the screw-shaped regulation body member, the dehumidification element and the electrode is provided in the regulation body member, and the regulation body member is connected to the screw hole of the camera housing. Since the regulation body member itself is a screw-shaped member, the dehumidification regulation body can be provided in a small space. Therefore, downsizing of the monitor camera device can be achieved while providing the dehumidification regulating function.

The dehumidification element is provided with a solid high-polymer electrolyte film, and the solid high-polymer electrolyte film is arranged so as to close up an opening provided on the regulation body member so as to communicate the inside and the outside of the housing. In this arrangement, the dehumidification regulation body can be downsized, and hence further downsizing of the monitor camera device is achieved.

According to another aspect of the invention, a dehumidification regulation body is provided. The dehumidification regulation body includes a dehumidification element, an engaging portion that engages an engaged portion of a camera housing, and an electrode whose one end supplies a power source to the dehumidification element and the other end penetrates through the engaging portion, and the dehumidification regulation body can be detachably attached to the camera housing by the engaging portion of the dehumidification regulation body and the engaged portion of the camera housing.

As described above, according to this embodiment, downsizing of the monitor camera device is achieved while providing the dehumidification regulating function to the monitor camera device. The dehumidification regulating function is a function to lower the humidity in the housing by an operation of the dehumidification element. The dehumidification regulation body realizes such a function.

Referring now to the drawings, the monitor camera device in this embodiment will be described. In this embodiment, the monitor camera device is for outdoor use.

FIG. 1 shows a principal portion of a structure relating to dehumidification in the monitor camera device in this embodiment, and FIG. 2 to FIG. 5 show a general structure of the monitor camera device. Referring first to FIG. 2 to FIG. 5, a general structure of the monitor camera device will be described.

Figure 2:
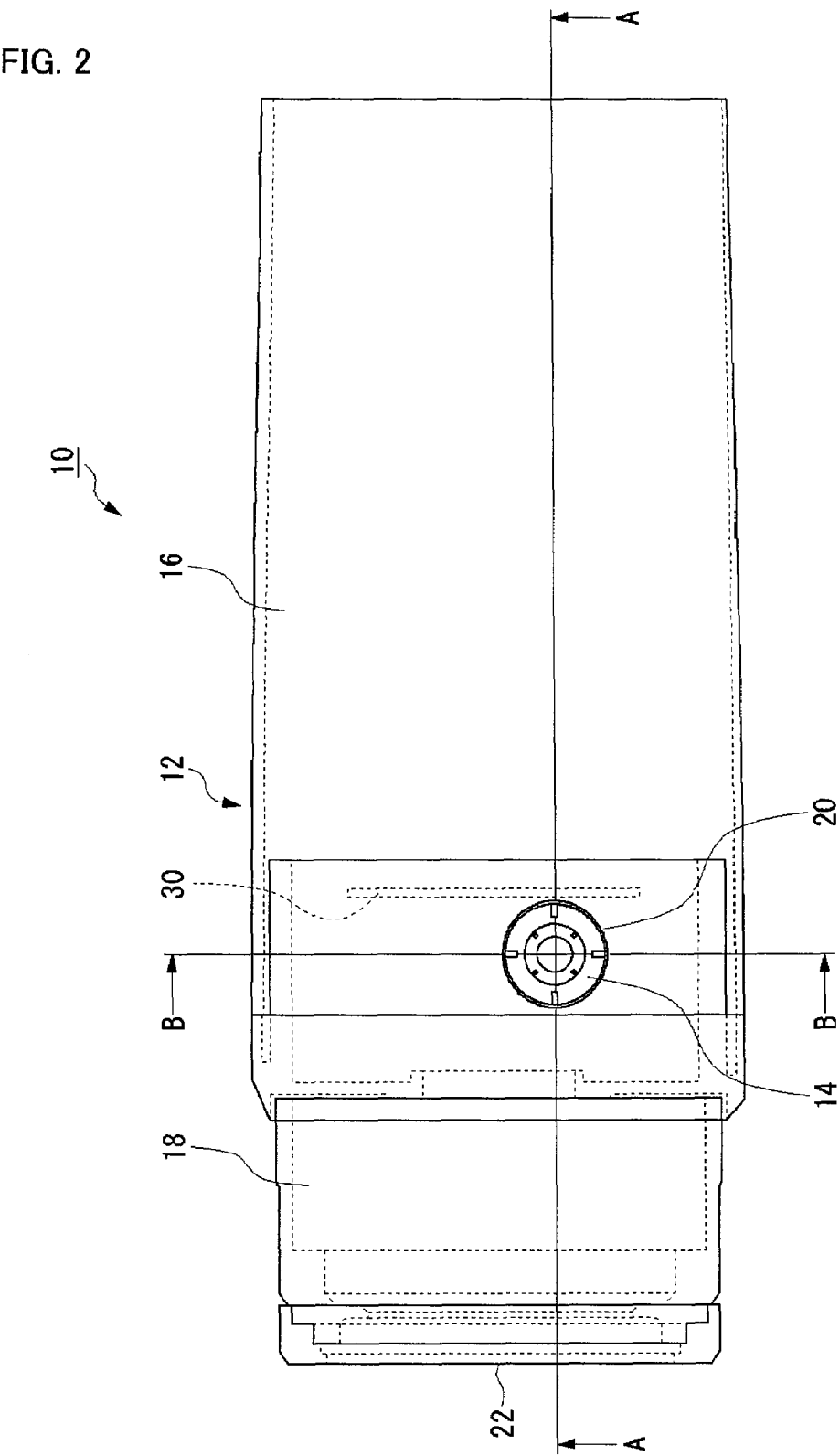
FIG. 2 is an appearance view of the monitor camera device according to the embodiment of the present invention, when viewed from the bottom.
Figure 3:
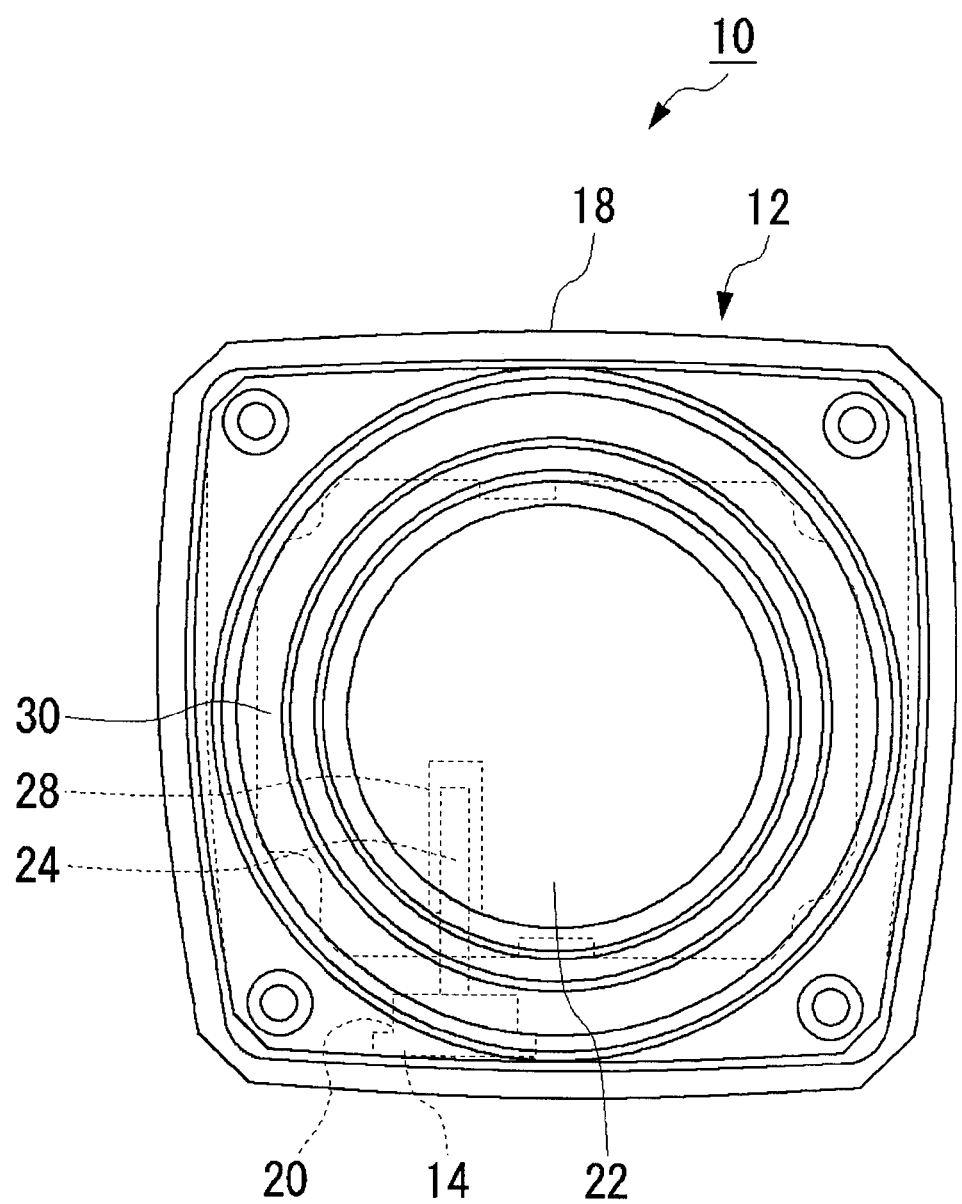
FIG. 3 is an appearance view of the monitor camera device according to the embodiment of the present invention, when viewed from the front.
Figure 4:
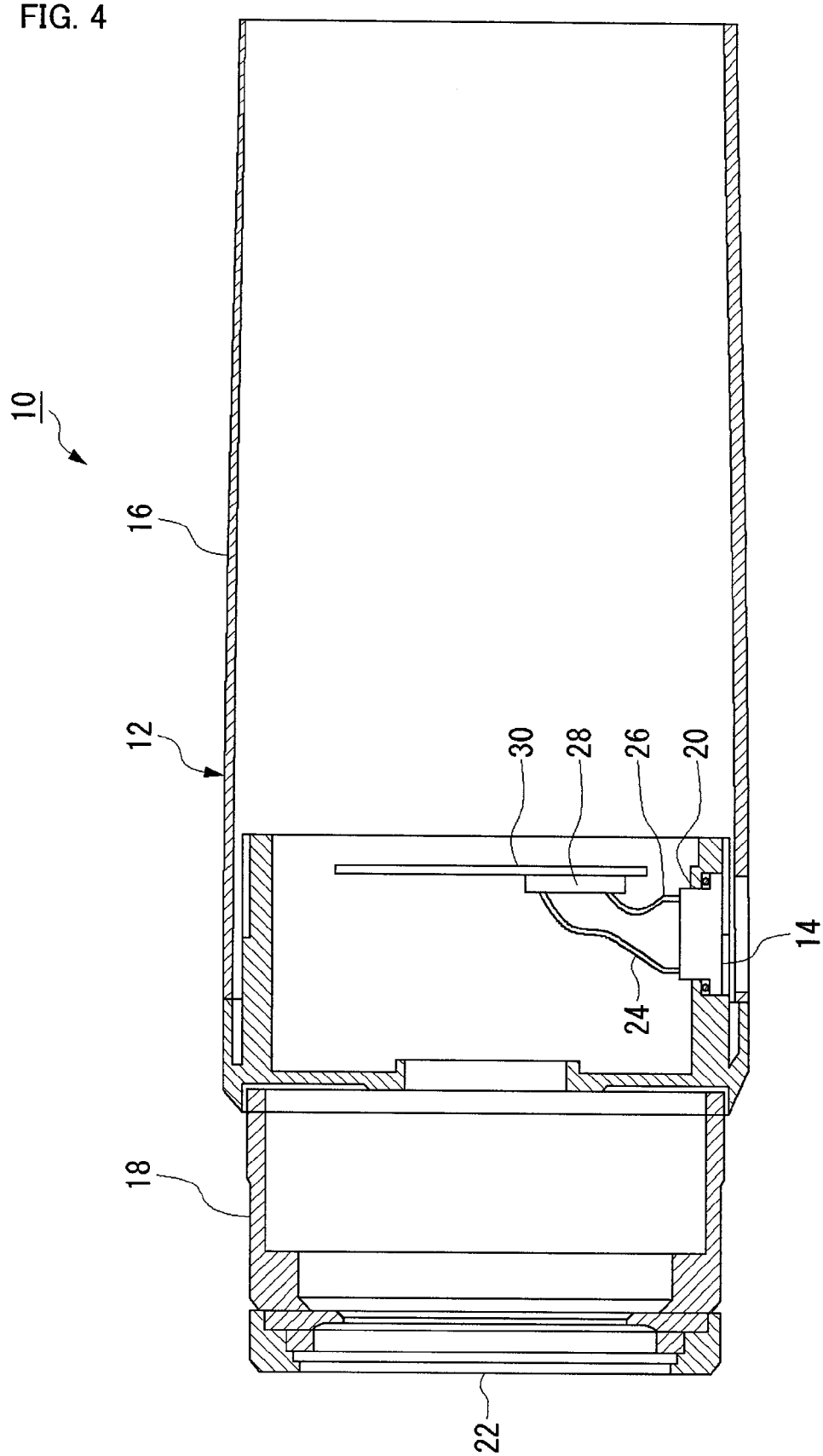
FIG. 4 is a cross-sectional view of the monitor camera device according to the embodiment of the present invention.
Figure 5:
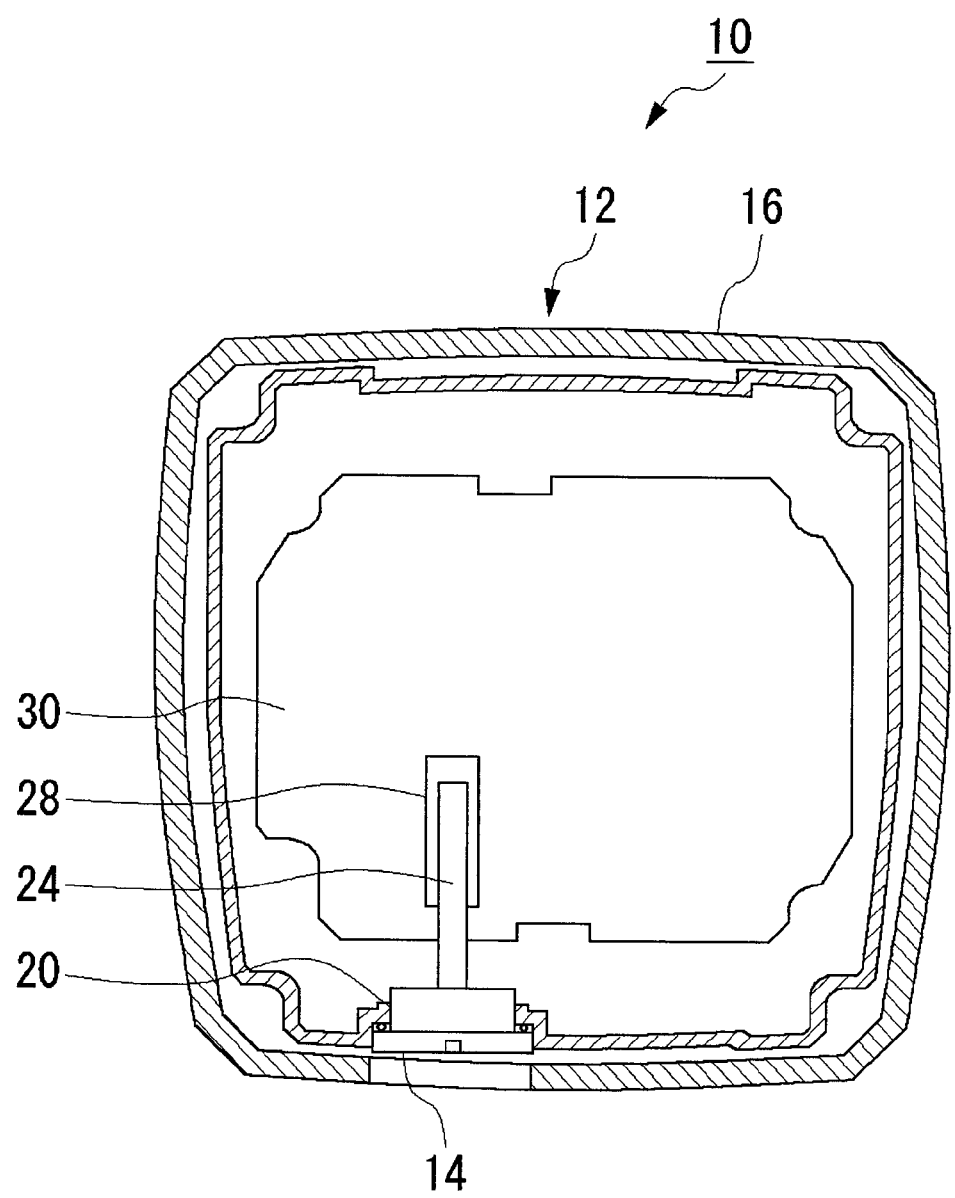
FIG. 5 is a cross-sectional view of the monitor camera device according to the embodiment of the present invention.

FIG. 2 and FIG. 3 are appearance drawings of a monitor camera device 10 when viewed from the bottom and from the front. FIG. 4 and FIG. 5 are cross-sectional views of the monitor camera device 10 taken along a line AA and a line BB in FIG. 2.

In FIG. 2 to FIG. 5, the monitor camera device 10 includes a camera housing 12 and a dehumidification regulation body 14. The camera housing 12 includes a cylindrical housing body 16 and a lens portion housing (lens barrel) 18, and the lens portion housing 18 is mounted to the front of the housing body 16. Although it is not shown in the drawing, a rear portion of the housing body 16 is also covered by the cover.

The dehumidification regulation body 14 is mounted to a mounting hole 20 formed on the housing body 16 on a front side with respect to a center thereof. The internal space of the camera housing 12 extends from the mounting portion of the dehumidification regulation body 14 to a front end of the lens portion housing 18. Therefore, by causing the dehumidification regulation body 14 to function, a transparent cover 22 portion at a front end can be dehumidified.

The dehumidification regulation body 14 is provided with lead wires 24, 26 mounted thereto so as to extend into the inside of the camera housing 12. A connector 28 is attached to distal ends of the lead wires 24, 26, and the connector 28 is mounted to a substrate 30 held in the camera housing 12. Power is supplied from a power source device for the entire monitor camera device 10 via the substrate 30 and then the connector 28 and the lead wires 24, 26 to the dehumidification regulation body 14.

Although omitted in FIG. 2 to FIG. 5, other various structures for constituting the camera are stored in the camera housing 12. Other structures include, for example, a lens, a CCD, a power source device, or the like, and substrates such as a main substrate other than the substrate 30.

Figure 6:
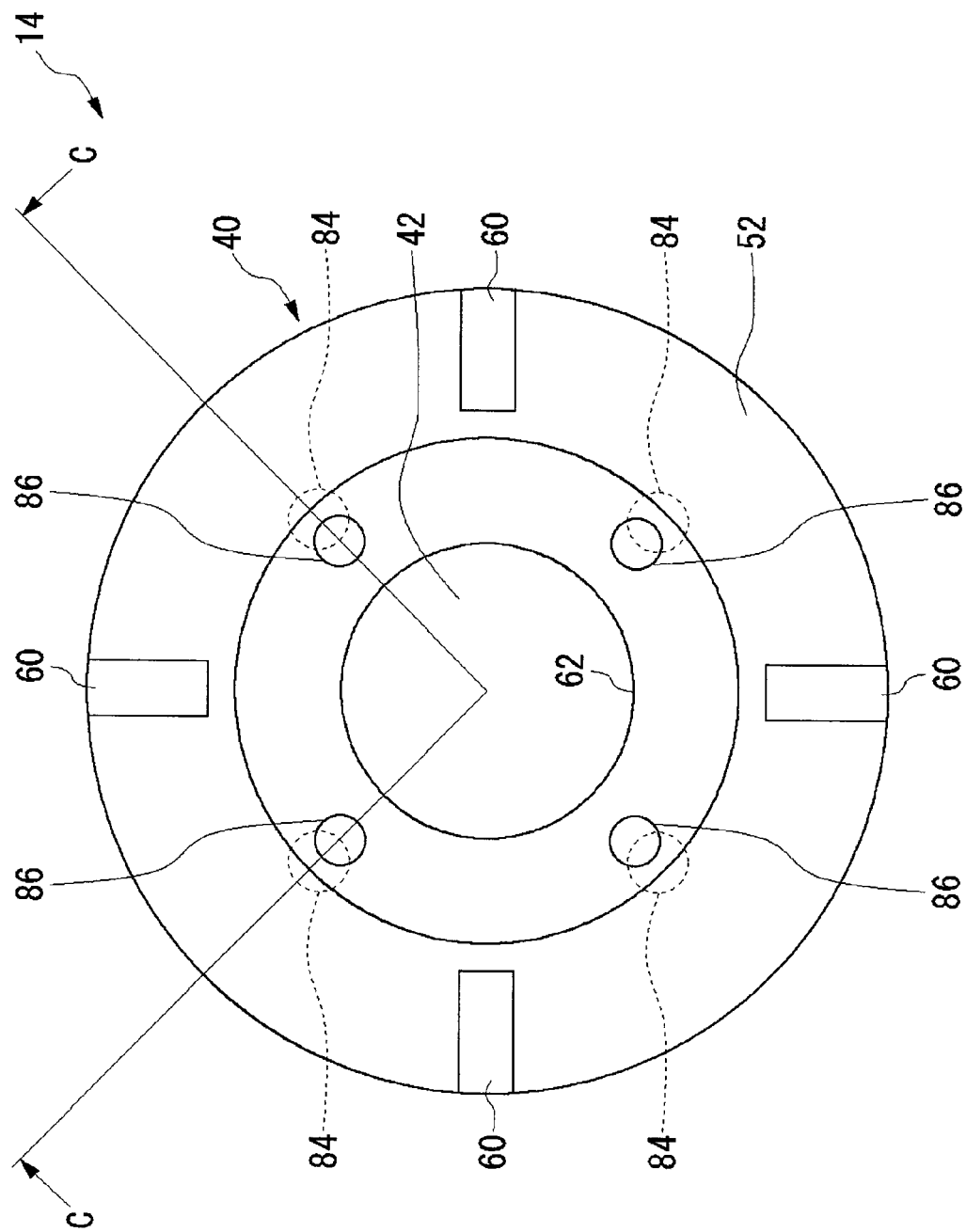
FIG. 6 is a plan view of a dehumidification regulation body in the monitor camera device according to the embodiment of the present invention.
Figure 7:
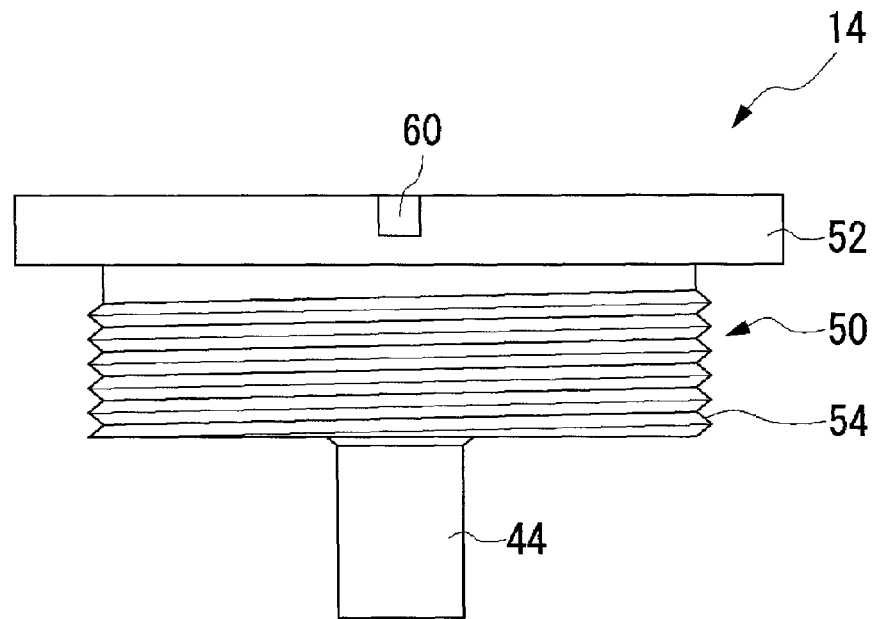
FIG. 7 is a side view of the dehumidification regulation body in the monitor camera device according to the embodiment of the present invention.
Figure 8:
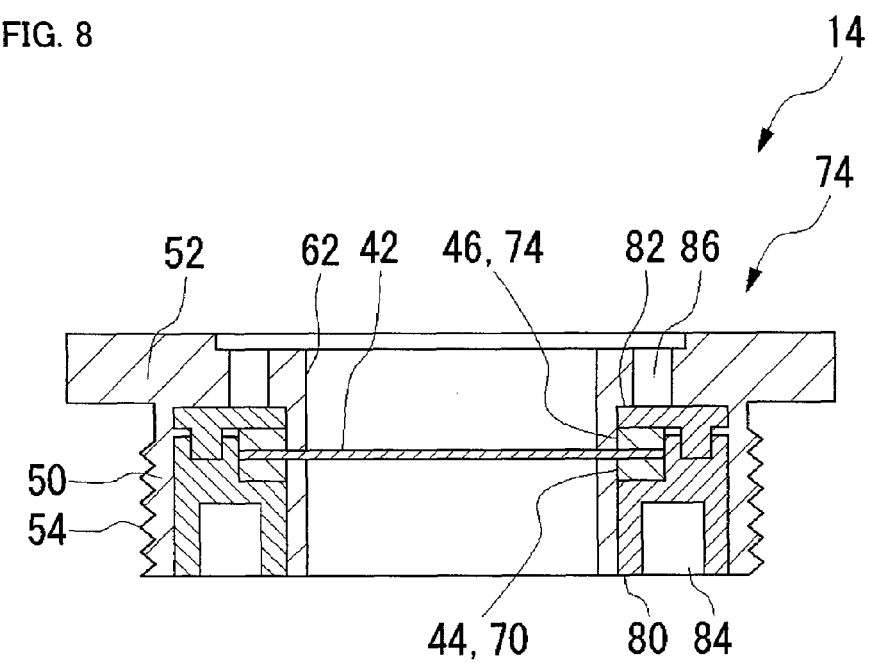
FIG. 8 is a cross-sectional view of the dehumidification regulation body in the monitor camera device according to the embodiment of the present invention.
Figure 9:
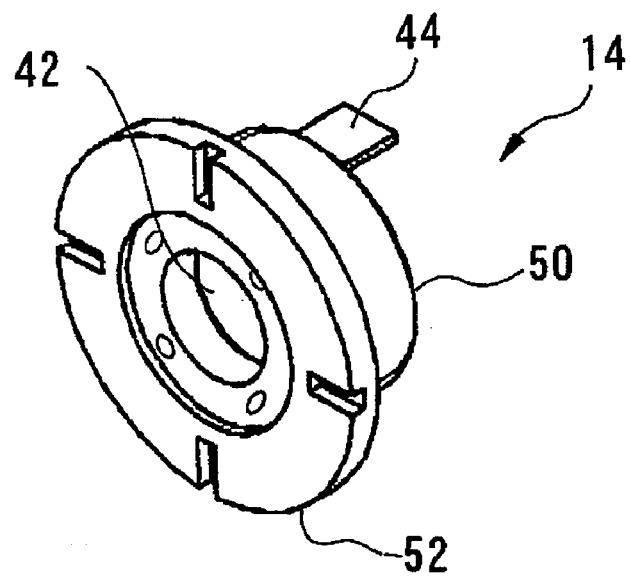
FIG. 9 is a perspective view of the dehumidification regulation body in the monitor camera device according to the embodiment of the present invention.
Figure 10:
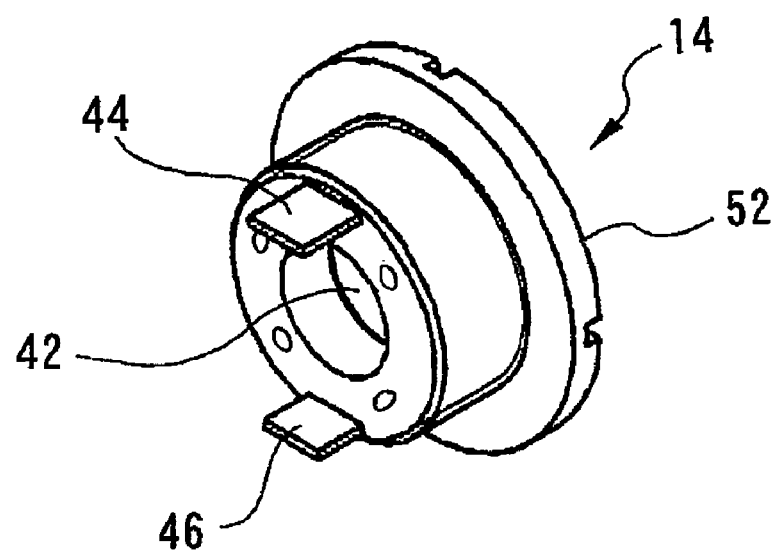
FIG. 10 is a perspective view of the dehumidification regulation body in the monitor camera device according to the embodiment of the present invention.

FIG. 1 is a cross-sectional view of a portion of the dehumidification regulation body 14, showing a principal portion of a dehumidification mechanism according to this embodiment as described above. FIG. 6 and FIG. 7 are a front view and a side view of the dehumidification regulation body 14 respectively. FIG. 8 is a cross-sectional view of the dehumidification regulation body 14 taken along a line C-C in FIG. 6. FIG. 9 and FIG. 10 are perspective views of the dehumidification regulation body 14 viewed from the head side and the opposite side thereof. Referring to these drawings, the dehumidification mechanism of this embodiment will be described.

As shown in FIG. 1 and so on, the dehumidification regulation body 14 includes a regulation body member 40, a dehumidification element 42, and electrode terminal pieces 44, 46, and the dehumidification element 42 and the electrode terminal pieces 44, 46 are integrated in the regulation body member 40.

The regulation body member 40 is formed of resin, has a screw shape, and includes a screw member 50 and a screw head portion 52. A male screw 54 is provided on the outer periphery of the screw portion 50. On the other hand, the camera housing 12 is provided with a female thread 56 on an inner peripheral surface of the mounting hole 20 thereof. The screw member 50 is tightened to the mounting hole 20. In this embodiment, the screw member 50 corresponds to the engaging portion of the dehumidification regulation body 14, and the mounting hole 20 corresponds to the engaged portion of the camera housing 12, so that the dehumidification regulation body 14 is detachably attached to the camera housing 12 by both of these members.

The screw head portion 52 has a flange shape. An O-ring 58 is interposed between the screw head portion 52 and the camera housing 12, and waterproof property is secured by the O-ring 58. The screw head portion 52 is provided with tool grooves 60 formed radially in four directions. A tool for tightening the dehumidification regulation body 14 to the camera housing 12 is inserted into the tool grooves 60.

An opening 62 is provided at a center portion of the regulation body member 40 so as to communicate the inside and the outside of the housing. The dehumidification element 42 is provided so as to close up the opening 62 as shown below.

The dehumidification element 42 is formed of a circular film, and is arranged at a center of the regulation body member 40 at a right angle with respect to the direction of the screw (axial direction). The diameter of the dehumidification element 42 is larger than the opening 62. Therefore, the dehumidification element 42 is held by a peripheral portion of the opening 62 over the entire circumference thereof at a portion of constant width along an edge thereof, whereby the dehumidification element 42 closes up the opening 62. In this arrangement, one surface of the dehumidification element 42 is faced toward the outside of the housing, and the other surface thereof is faced toward the inside of the housing.

The dehumidification element 42 has a three-layer structure provided with a solid high-polymer electrolyte film interposed on both sides thereof between the electrode films. When a voltage is applied to the electrode films on both sides, the electrode film on the anode side decomposes water molecules in air into oxygen and hydrogen by the electrolysis. The solid high-polymer electrolyte film functions as a hydrogen ion exchange film, and hydrogen generated by the electrode film on the anode side moves to the electrode film on the cathode side. Electrons move from the electrode film on the anode side via the power source to the electrode film on the cathode side. Then, the electrode film on the cathode side generates water molecules from hydrogen and oxygen by a reaction opposite from the electrolysis. In this manner, the dehumidification element 42 can move the water content in the space on the anode side to the space on the cathode side, and function as the dehumidification element.

The dehumidification element formed of the solid high-polymer electrolyte film as described above is disclosed, for example, JP-A-2000-202231 and JP-A-6-63343.

Subsequently, a structure for connecting the dehumidification element 42 to the power source will be described. In order to utilize the characteristics of the dehumidification element 42, the dehumidification element 42 is connected to the power source in such a manner that the inner side of the housing is the anode side and the outside of the housing is the cathode side.

As shown in FIG. 1, the dehumidification element 42 is interposed between the electrode terminal pieces 44, 46 which are made of metal into thin plates. The electrode terminal piece 44 comes into contact with the dehumidification element 42 from the inside of the housing and the electrode terminal piece 46 comes into contact with the dehumidification element 42 from the outside of the housing.

The electrode terminal piece 44 includes a contact portion 70 which comes into contact with the electrode film of the dehumidification element 42, and a terminal portion 72 extending from the contact portion 70. The contact portion 70 has a circular ring shape. The outer diameter of the contact portion 70 is slightly smaller than the outer diameter of the dehumidification element 42, and the inner diameter of the contact portion 70 is slightly larger than the diameter of the opening 62 of the regulation body member 40. Therefore, the contact portion 70 is provided so as to extend along the edge of the dehumidification element 42 over the entire circumference in the regulation body member 40, and is in contact with the edge of the dehumidification element 42 over the entire circumference.

The terminal portion 72 of the electrode terminal piece 44 has a band shape and projects from one position of the contact portion 70. The terminal portion 70 extends a little in the radial direction, then bent at a right angle, and extends in the screw axis direction (that is, the direction of engagement of the dehumidification regulation body 14). The terminal portion 72 is arranged slightly inwardly of the male thread 54 on the outer periphery of the screw member 50. The terminal portion 72 penetrates the screw member 50, and is projected from an end surface of the regulation body member 40 toward the inner side of the housing.

The other electrode terminal piece 46 has the similar structure as the electrode terminal piece 44 described above. That is, the electrode terminal piece 46 also has a structure in which a ring-shaped contact portion 74 and a band-shaped terminal portion 76 are connected.

However, the contact portion 74 of the electrode terminal piece 46 comes into contact with the dehumidification element 42 from the outside of the housing. Therefore, the contact portion 74 is located on the opposite side of the dehumidification element 42 from the contact portion 70 of the electrode terminal piece 44.

The electrode terminal piece 46 is provided so as to face the opposite direction from the electrode terminal piece 44. Here, the directions of electrode terminal pieces 44, 46 are the directions of the positions of the terminal portions 72, 76 on a plane perpendicular to the screw axis direction (direction of engagement). By the arrangement in the opposite direction, the terminal portions 70, 76 are located on the opposite side of the dehumidification element 42 from each other. The terminal portion 76 penetrates through the screw portion 50 as in the case of the terminal portion 70, and projects from an end surface of the regulation body member 40 into the inside of the housing. At distal ends of the both terminal portions 70, 76, the lead wires 24, 26 are soldered.

As described above, the electrode terminal pieces 44, 46 are the same in a point of being composed of the contact portion and the terminal portion. However, the dimensions of the respective parts may be different from each other to some extent.

The electrode terminal pieces 44, 46 are interposed between annular shaped holding members 80, 82 further from both sides. The holding members 80, 82 are formed of resin, and have a function to hold the electrode terminal pieces 44, 46 and the dehumidification element 42 in a metal mold at a time of manufacturing the dehumidification regulation body 14. The regulation body member 40 has four holes 84 on an end surface on the inside of the housing and another four holes 86 on an end surface on the outside of the housing. The holes 84, 86 are used for positioning the holding member 80, 82 at the time of manufacture.

Subsequently, a method of manufacturing the monitor camera device 10 in this embodiment will be described. As a method of manufacturing the dehumidification regulation body 14, the holding member 80, the electrode terminal piece 44, the dehumidification element 42, the electrode terminal piece 46, and the holding member 82 are arranged in the metal mold for resin molding. These members are placed one on top of another in the sequence described above as shown in FIG. 1 and FIG. 8, and are pressed against each other by the metal mold. The pins of the metal mold are fitted to the positions of the holes 84, 86 of the holding member 80 and the holding member 82, so that the positions of the holding member 80 and the holding member 82 are fixed. The directions of the electrode terminal pieces 44, 46 are also defined by the metal mold. As shown in FIG. 1, the both electrode terminal pieces 44, 46 are faced in the opposite directions from each other.

In a state in which the metal mold is closed, the resin molding is performed. Accordingly, the regulation body member 40 is formed and the dehumidification regulation body 14 is obtained. The holding members 80, 82 are cast into the regulation body member 40, and hence are integrated as a part of the regulation body member 40.

In the dehumidification regulation body 14 manufactured in the manner described above, the terminal portions 72, 76 of the electrode terminal pieces 44, 46 are projected from an end surface of the screw member 50. The lead wires 24, 26 are soldered to the terminal portions 72, 76. The distal ends of the lead wires 24, 26 are soldered to the connector 28.

The O-ring 58 is fitted to the screw member 50 of the dehumidification regulation body 14 and the dehumidification regulation body 14 is mounted to the mounting hole 20 of the camera housing 12 from the outside of the housing. In the case described here, the tool is fitted to the tool grooves 60. By turning the tool, the dehumidification regulation body 14 is secured to the mounting hole 20 as the screw hole, and the male thread 54 on the outer periphery of the screw member 50 engages the female thread 56 on the mounting hole 20. At this time, the O-ring 58 is interposed between the screw head portion 52 of the dehumidification regulation body 14 and the mounting base of the housing body 16 and is deformed.

When the dehumidification regulation body 14 is mounted, the connector 28 is connected to the connector of the substrate 30 supported by the camera housing 12. The connector 28 is connected so that the electrode terminal piece 44 of the dehumidification regulation body 14 comes to the anode side, and the electrode terminal piece 46 comes to the cathode side. Accordingly, the monitor camera device 10 is completed.

In the description above, assembly of the dehumidifying function is described, and assembly of the various camera parts such as the lens, the CCD, and the substrates is omitted.

Subsequently, the dehumidifying operation of the monitor camera device 10 in this embodiment will be described. A voltage is applied from the substrate 30 to the dehumidification element 42 of the dehumidification regulation body 14 via the connector 28, the lead wires 24, 26, the electrode terminal pieces 44, 46.

As described above, the dehumidification element 42 is held in the opening 62, and the surface on the anode side faces the space in the housing, and the surface on the cathode side faces the space outside the housing. Therefore, by the application of the voltage, the dehumidification element 42 functions and hence water molecules in the space in the housing moves to the space on the outside of the housing through the dehumidification element 42. More specifically, the water molecules in the space in the housing are decomposed into oxygen and hydrogen by the eletrolysis by the electrode film of the dehumidification element 42. Hydrogen moves to the electrode film on the opposite side through the dehumidification element 42. In association with electrolysis, electrons move to the electrode film on the opposite side through the power source, that is, through the lead wires 24, 26. Then, on the electrode film on the opposite side water molecules are generated from hydrogen and oxygen by the opposite reaction from the electrolysis. Water molecules are discharged from the opening 62 to the outside space.

The internal space at the mounting portion of the dehumidification regulation body 14 extends to the internal space of the transparent cover 22 located at the front most portion of the camera housing 12. Therefore, by the dehumidifying function of the dehumidification regulation body 14, dehumidification of the front most portion of the monitor camera device 10 is achieved, and hence favorable images can be obtained.

The monitor camera device 10 according to this embodiment has been described thus far. According to the monitor camera device 10 in this embodiment, the dehumidification regulation body 14 has the dehumidification element 42 and the electrodes, and the one end of the electrode supplies the power source to the dehumidification element 42, and the other end of the electrode penetrates through the engaging portion of the dehumidification regulation body 14. Therefore, power can be supplied from the inside of the housing to the dehumidification element 42 through the engaging portion of the detachably attached dehumidification regulation body 14. Therefore, the dehumidification regulation body 14 can be mounted to the camera housing 12 while occupying a small space. Accordingly, the monitor camera device 10 can be downsized while providing the dehumidification regulating function.

Even when the size of the monitor camera device 10 is equivalent, it is not necessary to increase the size for providing the dehumidification regulation body 14, so that downsizing of the monitor camera device 10 is achieved from this point of view.

According to the monitor camera device 10 in this embodiment, since the engaging portion of the dehumidification regulation body 14 is the screw member 50, the configuration of the engaging portion can be downsized. Therefore, further downsizing of the monitor camera device 10 is achieved.

According to the monitor camera device 10 in this embodiment, since the dehumidification element 42 and the electrodes are integrated in the screw member 50, the dehumidification regulation body 14 can be downsized. Therefore, further downsizing of the monitor camera device 10 is achieved.

According to the monitor camera device 10 in this embodiment, the dehumidification element 42 is provided with the solid high-polymer electrolyte film interposed between the electrode films on both surfaces. The dehumidification element 42 is arranged with the one surface faced toward an outside of the camera housing 12 and the other surface faced toward an inside of the camera housing 12. In this arrangement, the dehumidification regulation body 14 can be downsized, and hence further downsizing of the monitor camera device 10 is achieved.

According to the monitor camera device 10 in this embodiment, the electrode is composed of the electrode terminal pieces 44, 46, and the terminal portions 72, 76 of the electrode terminal pieces 44, 46 extend in the engaging portion toward the inside of the camera housing. In this arrangement, by mounting the dehumidification regulation body 14 to the camera housing 12 and connecting the power source to the electrode terminal pieces 44, 46 extending in the camera housing, the dehumidifying function is obtained. Therefore, the dehumidification regulation body 14 can be provided in a small space, and hence further downsizing of the monitor camera device 10 is achieved.

According to the monitor camera device 10 in this embodiment, the contact portions 70, 74 of the electrode terminal pieces 44, 46 are provided along the edge of the dehumidification element 42, and the terminal portions are projected from the contact portions 70, 74. Then, the pair of electrode terminal pieces 44, 46 are provided on the one surface and the other surface of the dehumidification element 42 so as to face the opposite directions from each other. Accordingly, the terminal portions of both polarities are located on the opposite side of the dehumidification element 42. Therefore, insulation of the electrodes can easily be achieved. Consequently, downsizing of the dehumidification regulation body 14 and further downsizing of the monitor camera device 10 in association therewith is achieved.

According to the monitor camera device 10 in this embodiment, the dehumidification regulation body 14 is composed of the screw-shaped regulation body member 40, the dehumidification element 42 and the electrodes are provided on the regulation body member 40, and the regulation body member 40 is connected to the screw hole of the camera housing 12. Since the regulation body member 42 itself is composed of the screw-shaped member, the dehumidification regulation body 14 can be provided in a small space. Therefore, downsizing of the monitor camera device 10 is achieved while providing the dehumidification regulating function. As described above, the dehumidification element 42 is provided with the solid high-polymer electrolyte film and the solid high-polymer electrolyte film is arranged so as to close up the opening 62 that is provided on the regulation body member 40 and communicates the inside and the outside of the housing. Accordingly, the dehumidification regulation body 14 can be downsized, and hence further downsizing of the monitor camera device 10 is achieved.

The dehumidification regulation body 14 in this embodiment can be configured compactly as described above. Accordingly, it can contribute to downsizing of the equipment such as the monitor camera device 10 provided with the dehumidification regulation body 14.

Figure 11A:
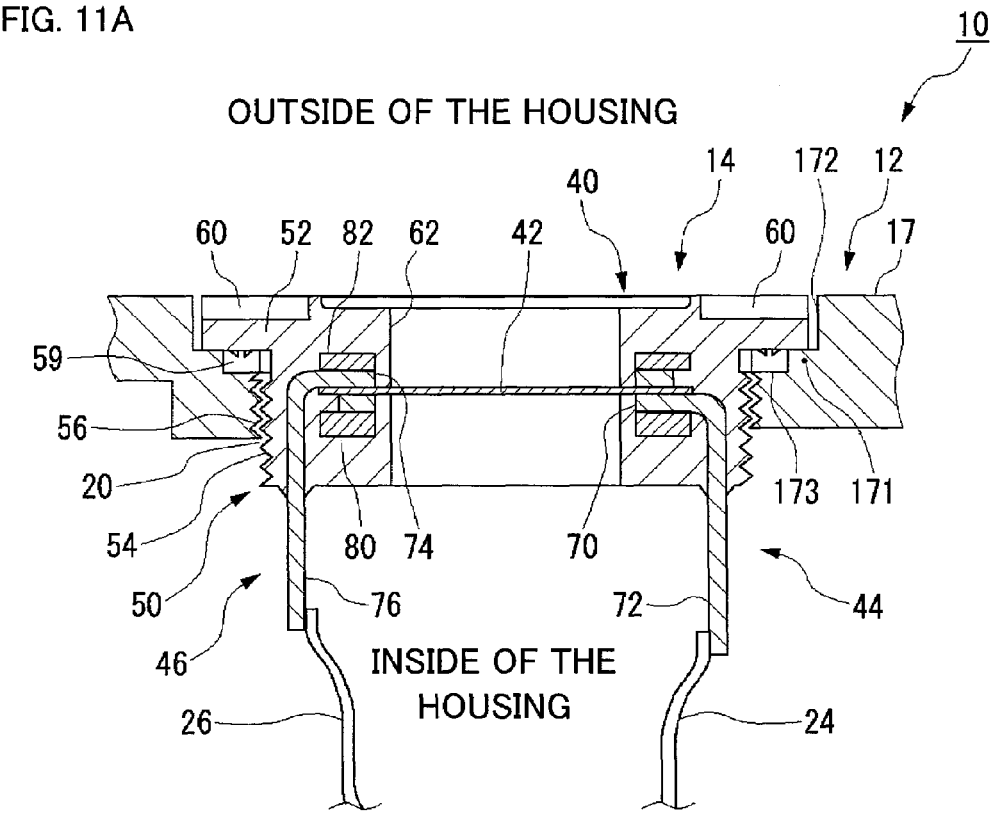
FIG. 11A is a cross-sectional view showing a configuration in which the shape of an O-ring is different.

FIG. 11A shows a modification of the structure shown in FIG. 1 described above. As described below, the cross-sectional shape of the O-ring and the structure of the mounting hole of the housing body are different between FIG. 1 and FIG. 11A.

Figure 11B:
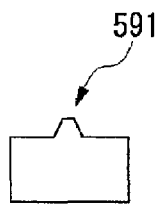
FIG. 11B is a cross-sectional view of the O-ring.

In FIG. 1, the cross-section of the O-ring 58 has the circular shape. In contrast, the monitor camera device 10 shown in FIG. 11A has an O-ring 59 whose cross-section has a square shape (FIG. 11B). In this manner, the shape of the cross-section of the O-ring is not limited to the circular shape.

The O-ring 59 has a projection 591. The projection 591 is provided at a portion that comes into tight contact with the screw head portion 52. More specifically, the projection 591 is composed of a small projection at a center of the surface that comes into contact with the screw head portion 52.

By the provision of the projection 591, contact between the O-ring 59 and the screw head portion 52 is further ensured. Therefore, the sealing property is improved. By the provision of the projection 591, a frictional force that is exerted to the O-ring 59 at the time of assembly can be reduced, and hence the torsional deformation of the O-ring 59 can be prevented. Therefore, a waterproof function of the O-ring 59 is further ensured.

In FIG. 11A, a housing body 17 includes a shoulder or step portion 171 that comes into contact with the screw head portion 52 on an outside portion of the O-ring 59. This arrangement contributes to securement of the waterproof property between the dehumidification regulation body 14 and the housing body 17.

The configuration of the shoulder portion 171 will be described further in detail. The housing body 17 includes a recess 172 for accommodating the screw head portion 52. The O-ring 59 is interposed between a bottom surface 173 of the recess and the screw head portion 52. The shoulder portion 171 is provided at a corner of the recess 172, and the shoulder portion 171 surrounds a periphery of the O-ring 59.

In a state in which the dehumidification regulation body 14 is mounted, the shoulder portion 171 comes into contact with the screw head portion 52. The shoulder portion 171 functions as a seat surface when tightening the screw. In other words, the contact state between the screw and the seat surface is achieved by the shoulder portion 171.

The shoulder portion 171 defines a height of a space for the O-ring 59 (a distance between the bottom surface 173 of the recess and the screw head portion 52). Therefore, the height of the O-ring 59 in the deformed state is also defined by the shoulder portion 171. The height of the shoulder portion 171 is set to a value adequate for the O-ring 59 to deform and demonstrate its waterproof property.

In this arrangement, variations in the amount of deformation of the O-ring 59 at the time of assembly can be reduced, and hence the required and adequate amount of deformation can be secured. Accordingly, variations in the sealed state are reduced, and hence a sealing property is secured. Therefore, the waterproof property required for the dehumidification element can reliably be obtained.

Figure 12:
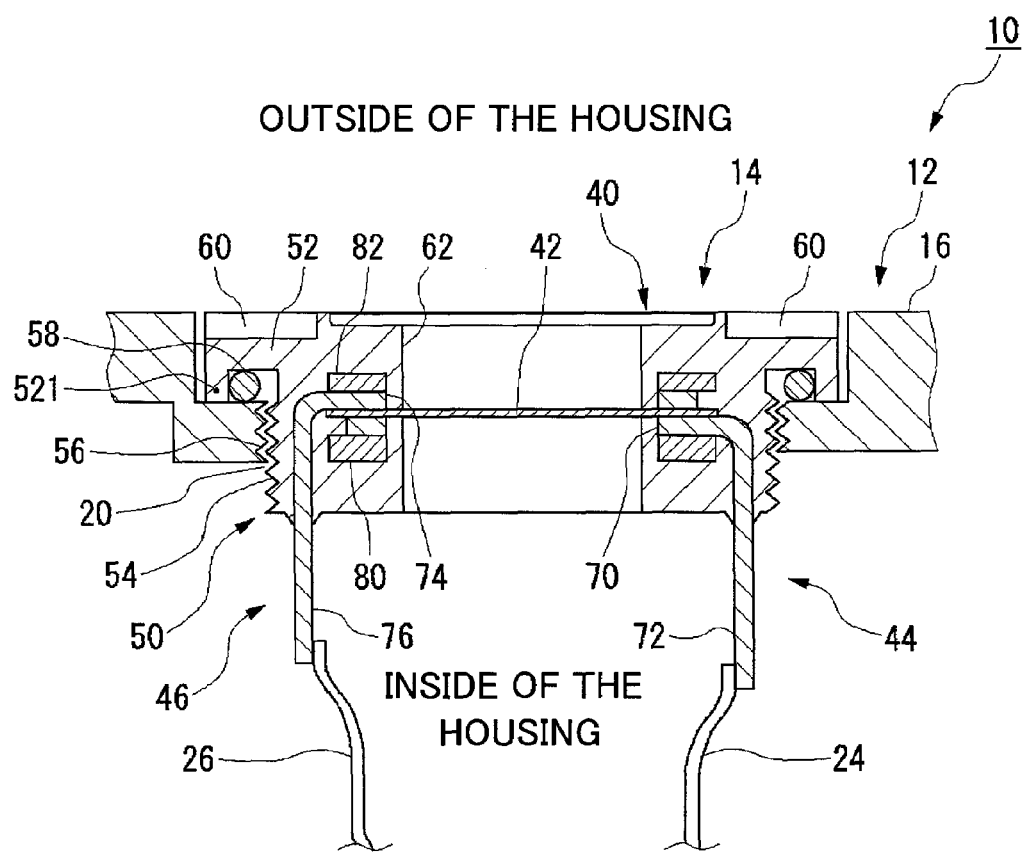
FIG. 12 is a cross-sectional view of a configuration in which the shape of a screw head portion is different.

FIG. 12 shows another modification. In FIG. 11A, the shape of the housing body is modified. Instead, in FIG. 12, the shape of the regulation body member 40 is modified.

In FIG. 12, the screw head portion 52 is provided with a rib 521 on the outer periphery thereof. The rib 521 projects toward the bottom surface of the recess of the housing body 16. A distal end surface of the rib 521 is in contact with the bottom surface of the recess. The contact state between the screw and the seat surface is ensured by the rib 521. The height of the rib 521 defines the height of the O-ring 58 after deformation. Therefore, an adequate amount of deformation of the O-ring 58 is secured and the waterproof property is preferably secured as with the configuration shown in FIG. 11A.

Figure 13:
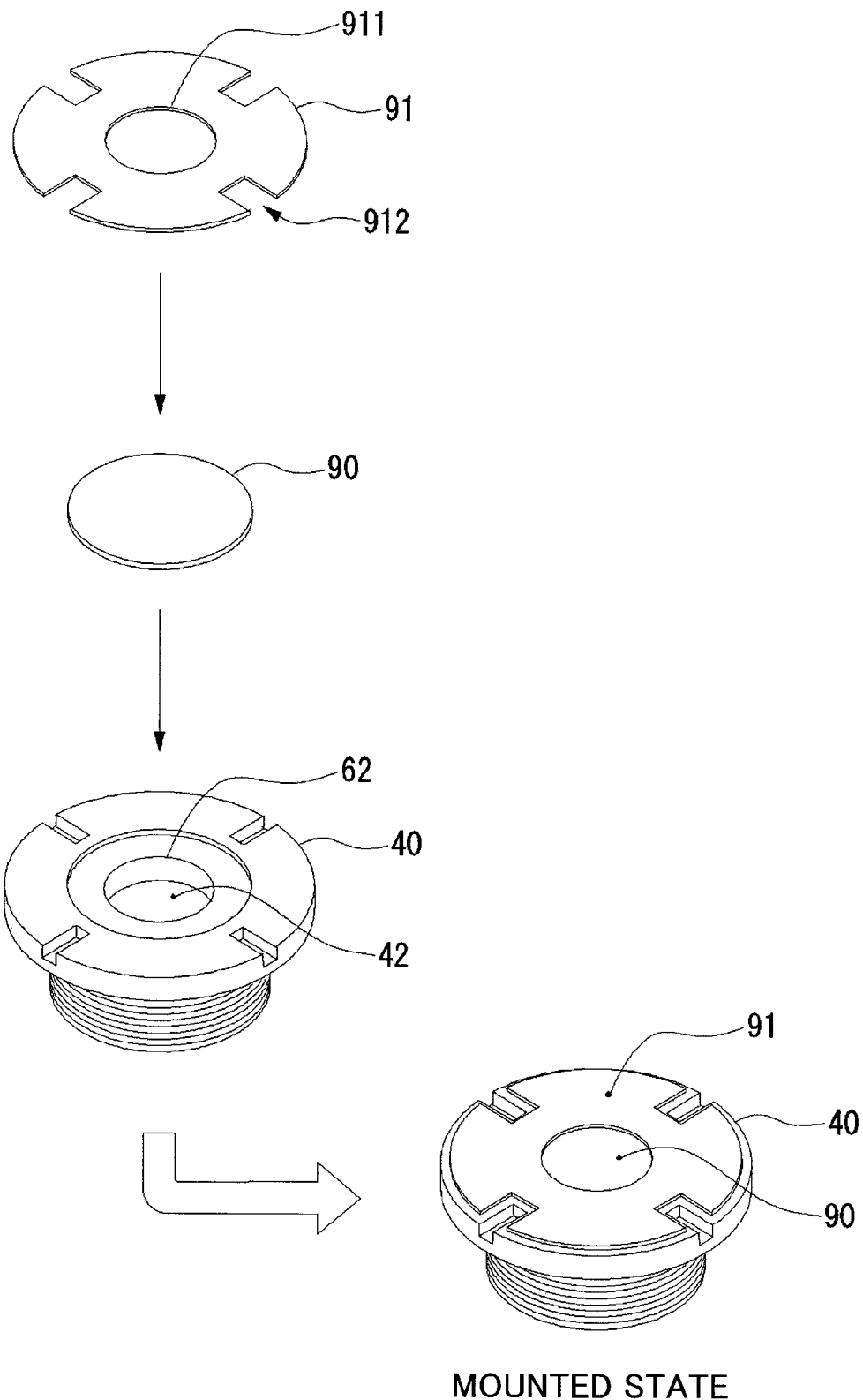
FIG. 13 is a perspective view of the dehumidification regulation body provided with a waterproof film and a protective sheet.

FIG. 13 shows the dehumidification regulation body 14 in a state in which a waterproof film 90 is mounted thereto. When putting the dehumidification regulation body 14 in this embodiment into a practical use, it is preferable to provide the waterproof film 90 as shown in FIG. 13.

In FIG. 13, the dehumidification regulation body 14 has the same configuration as the one shown in FIG. 1 and FIG. 9. The waterproof film 90 has a circular shape, and is adhered to the bottom surface of the shallow recess of the regulation body member 40. The waterproof film 90 closes up the opening 62 provided with the dehumidification element 42. Accordingly, the waterproof film 90 protects the dehumidification element 42 from water content. The waterproof film as described above is employed in other products. The waterproof film 90 is a porous film. A porous film of Polytetrafluoroethylene resin is known as the waterproof film.

Since the monitor camera in this embodiment is the outdoor equipment, it is desired to have a configuration in which the waterproof film 90 is protected from the outdoor environment. Therefore, a protective sheet 91 is provided on an outside of the waterproof film 90. The outer diameter of the protective sheet 91 is substantially the same as the outer diameter of the regulation body member 40. The protective sheet 91 has a circular hole 911 at a center thereof. Accordingly, an edge of the waterproof film 90 is covered by the protective sheet 91, and the waterproof film 90 (other than the edge) is exposed.

The protective sheet 91 is adhered onto the waterproof film 90 and the regulation body member 40 at a time. An outside portion is adhered to the regulation body member 40 and an inside portion is adhered to the waterproof film 90. With the protective seat 91 configured as described above, a function to prevent the waterproof film 90 from coming apart is obtained.

A slit 912 for releasing the tool grooves 60 is provided on an outer peripheral portion of the protective sheet 91. Accordingly, the dehumidification regulation body 14 can be assembled to the monitor camera in a state in which the waterproof film 90 and the protective sheet 91 are already adhered. Therefore, it is not necessary to perform a waterproofing operation such as adhesion of the sheet or the like after assembly. In this manner, the dehumidification regulation body 14 can advantageously provide the waterproof property of the dehumidification element 42 independently, and hence the assembly operation is facilitated.

The preferred embodiments of the present invention which are considered at this moment have been described thus far. However, it is understood that various modifications may be made for the embodiments, and the attached claims are intended to include all these modifications within the real spirit and scope of the present invention.

INDUSTRIAL APPLICABILITY

As described above, the monitor camera device according to the present invention can be downsized while providing the dehumidification regulating function. The present invention is effective as the outdoor monitor camera and so on.

The invention claimed is:

1. A monitor camera device comprising:
   a camera housing having an engaged portion comprising a through hole through the camera housing, and
   a dehumidification regulation body having a dehumidification element, an electrode, and an engaging portion, mounted within the through hole, that engages the engaged portion of the camera housing, the dehumidification regulation body being configured so that one end of the electrode supplies a power source to the dehumidification element and the other end of the electrode penetrates through the engaging portion of the dehumidification regulation body, the dehumidification regulation body being detachably attached to the camera housing by the engaging portion of the dehumidification regulation body and the engaged portion of the camera housing.

2. The monitor camera device according to claim 1, wherein the engaging portion is a screw member provided with a male thread on an outer periphery thereof.

3. The monitor camera device according to claim 2, wherein the dehumidification element and the electrode are integrated in the screw member.

4. The monitor camera device according to claim 1, wherein the dehumidification element is provided with a solid high-polymer electrolyte film interposed on both surfaces thereof between electrode films, and the dehumidification element is arranged with one surface faced an outside of the camera housing and with the other surface faced an inside of the camera housing.

5. The monitor camera device according to claim 4, wherein the electrode comprises an electrode terminal piece, and the electrode terminal piece comprises a contact portion that comes into contact with the electrode film and a terminal portion that extends from the contact portion toward the inside of the camera housing through the engaging portion.

6. The monitor camera device according to claim 5, wherein the contact portion of the electrode terminal piece is provided along an edge of the dehumidification element, the terminal portion is projected from the contact portion, and a pair of electrode terminal pieces are provided on one surface and the other surface of the dehumidification element so as to face the opposite directions from each other.

7. A monitor camera device comprising:
a camera housing provided with a screw hole, and
a screw-shaped dehumidification regulation body, having a dehumidification element and an electrode integrated therein,
wherein the screw-shaped dehumidification regulation body is screwed into the screw hole of the camera housing.

8. The monitor camera device according to claim 7, wherein the dehumidification element comprises a solid high-polymer electrolyte film, and the solid high-polymer electrolyte film is arranged so as to close up an opening provided on the screw-shaped dehumidification regulation body so as to communicate an inside and an outside of the housing.

9. A dehumidification regulation body comprising:
a dehumidification element,
an engaging portion that engages an engaged portion of a camera housing within a through hole of the engaged portion through the camera housing, and
an electrode whose one end supplies a power source to the dehumidification element and the other end penetrates through the engaging portion,
wherein the dehumidification regulation body is detachably attached to the camera housing by the engaging portion of the dehumidification regulation body and the engaged portion of the camera housing.

* * * * *